United States Patent
Terpay et al.

(10) Patent No.: US 6,651,988 B2
(45) Date of Patent: Nov. 25, 2003

(54) COMPACT ACTUATOR WITH HYDRAULIC SEAL

(75) Inventors: Gregory Waston Terpay, Whippany, NJ (US); George Gustave Zipfel, Summitt, NJ (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 134 days.

(21) Appl. No.: 09/748,990

(22) Filed: Dec. 27, 2000

(65) Prior Publication Data

US 2002/0079649 A1 Jun. 27, 2002

(51) Int. Cl.$^7$ ................................................ F16J 15/32
(52) U.S. Cl. ...................... 277/560; 92/168; 277/909
(58) Field of Search ................................ 277/434, 500, 277/503, 505, 506, 507, 534, 909, 436–439, 449, 452, 485; 403/220, 291; 248/554, 555, 556, 608, 609; 92/168, 139, 179, 206, 259

(56) References Cited

U.S. PATENT DOCUMENTS

| | | | |
|---|---|---|---|
| 1,667,941 A | 5/1928 | Madsen | |
| 2,038,515 A | 4/1936 | Marien | 309/45 |
| 2,115,346 A | 4/1938 | Summers | 286/11 |
| 2,180,795 A | * 11/1939 | Christensen | 277/448 |
| 2,365,725 A | 12/1944 | Phillips | 29/156.5 |
| 2,600,353 A | 6/1952 | Wightman | 308/163 |
| 2,630,358 A | 3/1953 | Stevens | 309/44 |
| 2,680,585 A | 6/1954 | Crede | 248/21 |
| 2,739,855 A | 3/1956 | Bruning | 309/23 |
| 2,744,718 A | 5/1956 | Markowski et al. | 248/358 |
| 2,927,831 A | * 3/1960 | Tuczek | 277/467 |
| 2,944,843 A | 7/1960 | Colby | 286/11.14 |
| 3,100,648 A | 8/1963 | Lee et al. | 277/59 |
| 3,365,032 A | 1/1968 | Gorndt | 188/86 |
| 3,455,564 A | 7/1969 | Dega | 277/134 |
| 3,521,893 A | * 7/1970 | Josephson | 277/584 |
| 3,582,093 A | * 6/1971 | Lucien | 277/434 |
| 3,603,602 A | 9/1971 | Padula | 277/164 |
| 3,695,622 A | 10/1972 | Davis et al. | 277/139 |
| 3,727,925 A | * 4/1973 | Jones | 277/468 |
| 3,913,460 A | 10/1975 | Wright | 92/85 |
| 3,948,498 A | 4/1976 | Hirano | 267/35 |
| 4,143,586 A | * 3/1979 | Zitting | 92/206 |

(List continued on next page.)

Primary Examiner—Anthony Knight
Assistant Examiner—William D. Hutton
(74) Attorney, Agent, or Firm—Morre & Van Allen, PLLC; Matthew W. Witsil

(57) ABSTRACT

An actuator for use in an active mount system for reducing vibration transmission from a vibrating component to a support structure. The actuator is disposed in a housing that is attached to the vibrating component or the support structure. The actuator includes a piston moveably disposed in a casing, and a piston rod assembly that is connected to the other one of the vibrating component or the support structure. A seal assembly, disposed either in a groove in the piston or in a groove in the casing, provides a seal between the piston and casing. The seal assembly includes an annular seal member comprising polytetrafluoroethylene resin, backing rings on each side of the seal member, and an annular compression spring in the groove between one of the backing rings and one edge of the groove. The spring exerts force axially to compress the seal member, impelling the seal member to increase in dimension radially and maintain the seal between the piston and casing, and allows for volume expansion of the seal member with temperature. The piston may be barrel-shaped for use in a casing with a cylindrical interior surface, or the inner surface of the casing may define an hourglass-shape for use with a cylindrical piston. Both designs allow the actuator to accommodate transverse loads without binding of the piston within the casing.

46 Claims, 11 Drawing Sheets

U.S. PATENT DOCUMENTS

| | | | | |
|---|---|---|---|---|
| 4,204,690 A | * | 5/1980 | Holland et al. | 277/468 |
| 4,306,728 A | * | 12/1981 | Huperz et al. | 277/536 |
| 4,365,771 A | * | 12/1982 | Halwes | 188/378 |
| 4,379,558 A | | 4/1983 | Pippert | 277/188 A |
| 4,448,428 A | | 5/1984 | Marsi | 277/92 |
| 4,477,090 A | * | 10/1984 | Johansson et al. | 277/447 |
| 4,582,303 A | | 4/1986 | Taylor | 267/64.13 |
| 4,582,330 A | * | 4/1986 | Lew et al. | 277/587 |
| 4,844,487 A | | 7/1989 | Eakin | 277/221 |
| RE33,003 E | * | 8/1989 | Dugan | 277/188 |
| 4,887,788 A | | 12/1989 | Fischer et al. | 248/562 |
| 5,005,638 A | | 4/1991 | Goth et al. | 165/80.4 |
| 5,066,026 A | | 11/1991 | Heck et al. | 277/96.1 |
| 5,330,156 A | | 7/1994 | McKavanagh | 251/159 |
| 5,442,993 A | | 8/1995 | Baliotti, II et al. | 92/84 |
| 5,456,161 A | | 10/1995 | Yuda et al. | 92/169.1 |
| 5,542,682 A | | 8/1996 | Goldstein et al. | 277/164 |
| 5,597,168 A | | 1/1997 | Antonini | 277/152 |
| 5,730,444 A | | 3/1998 | Notter | 277/153 |
| 5,799,953 A | | 9/1998 | Henderson | 277/554 |
| 5,833,245 A | * | 11/1998 | Gallagher | 277/549 |
| 6,047,970 A | * | 4/2000 | Friend et al. | 277/550 |
| 6,305,265 B1 | * | 10/2001 | Bingham et al. | 92/168 |

* cited by examiner

COMPACT ACTUATOR WITH HYDRAULIC SEAL

GOVERNMENT RIGHTS

The Government has rights to the invention pursuant to government contract N000014-96-C-2079 awarded by the United States Naval Research Laboratory.

BACKGROUND

The present invention relates generally to a hydraulic actuator and, more particularly, to an improved hydraulic actuator for use in an active mount for a vibrating component in a system for reducing vibration and noise transmission from the vibrating component to a support structure.

Hydraulic actuators are used in numerous environments to induce movement of one object with respect to another object. A hydraulic actuator generally includes a cylinder and a moveable piston inside the cylinder. A piston rod is connected to the piston and extends outwardly from one end of the cylinder where the rod end is attached to the first object. The other end of the cylinder is mounted, directly or indirectly, to the second object. The means for mounting the piston rod and cylinder to the objects may incorporate flexible bearing assemblies to provide some "softness" to the attachment to allow for possible misalignment. Such bearing assemblies preferably comprise elastomeric material. Pressurized hydraulic fluid is introduced into the interior of the cylinder on one or both sides of the piston to effect longitudinal movement of the piston in the cylinder so that the objects are moved relative to one another.

Hydraulic actuators may be used as a component of an active mount in a system for reducing vibration and noise transmission from a vibrating component to a support structure. For example, hydraulic actuation systems are used for actively reducing the vibratory and acoustic loads on aircraft, particularly rotary wing aircraft such as helicopters. A primary source of vibratory and acoustic loads in a helicopter is the main rotor system. The main rotor system of a helicopter includes rotor blades mounted on a vertical shaft that projects from a transmission, often referred to as a gearbox. The gearbox comprises a number of gears that reduce the rotational speed of the helicopter's engine to the much slower rotational speed of the main rotor blades. The gearbox has a plurality of mounting "feet" which are connected directly to structure in the airframe that supports the gearbox. The main rotor lift and driving torque produce reaction forces and moments on the gearbox. All of the lift and maneuvering load torques are passed from the main rotor blades to the airframe through the mechanical connection between the gearbox feet and the airframe. The airframe structure that supports the gearbox is designed to react to these primary flight loads and safely and efficiently transmit the flight loads to the airframe.

In addition to the nearly static primary flight loads, the aircraft is also subjected to vibratory loads originating from the main rotor blades and acoustic loads generated by clashing of the main rotor transmission gears. The vibratory and acoustic loads produce vibrations and audible noise that are communicated directly to the helicopter airframe via the mechanical connection between the gearbox and the airframe. This mechanical connection thus becomes the "entry point" for the unwanted vibration and noise energy into the helicopter cabin. The vibrations and noise within the aircraft cabin cause discomfort to the passengers and crew. In addition, low frequency rotor vibrations are a primary cause of maintenance problems in helicopters.

Active vibration and noise reduction systems in aircraft utilize sensors to monitor the status of the aircraft, or the vibration producing component, and a computer-based controller to command actuators to reduce the vibration and noise. The sensors are located throughout the aircraft and provide signals to the adaptive controller. The controller provides signals to the hydraulic actuation system, including a plurality of actuators located at strategic places within the aircraft. The actuators produce controlled forces or displacements that attempt to minimize vibration and noise at the sensed locations.

Two methods of actuator placement are frequently used in the active system: (1) distribution of actuators over the airframe, or (2) co-location of the actuators at, or near, the vibration or noise entry point. When applied to the main rotor system of a helicopter, the co-location approach places the actuators at or near the structural interface between the transmission and airframe stopping vibration and noise near the entry point before it is able to spread out into the aircraft. This has the advantage of reducing the number of actuators and the complexity of the control system. Active systems using co-location to counteract vibration and noise employ actuators mounted in parallel (across) or in series (between) the transmission gearbox feet and airframe support structure.

When the actuator is mounted in series with the vibrating component and its support structure, six possible degrees of freedom exist between the two objects. However, only the degree of freedom along the principle load-carrying axis is actively controlled for vibration and noise reduction. The remaining degrees of freedom must remain unconstrained to prevent vibration and noise from reaching the support structure. The longitudinal axis of the actuator is aligned with the principle load carrying axis. Further, since the elastomeric bearing is located between the piston rod and the attachment point to the vibrating component, the bearing must provide high static and dynamic stiffness along this active, load-carrying axis so that motions of the piston translate directly into unattenuated motions at the attachment point. To ensure that motions at the attachment point along the five non-active degrees of freedom do not create vibration and noise, the stiffness between the attachment point and actuator along these directions must be low. However, the need for the elastomeric bearing to be stiff along its principle load-carrying axis, yet soft about the other five degrees of freedom, can cause the elastomeric bearing to be unstable under load. Also, transverse and rotational motions at the attachment point become transverse and rotational forces through the stiffness of the elastometric bearing. These forces are transmitted to the piston and can induce high loads between the piston and cylinder that may cause the piston to bind.

Moreover, since hydraulic actuators operate under high pressure, leakage of hydraulic fluid often occurs. This leads to maintenance problems as well as environmental concerns. Additionally, escaping hydraulic fluid can damage the elastomeric material of the bearing.

Examples of conventional seals used between a piston and a cylinder include elastomeric seals, spring-energized seals, and piston rings. Elastomeric seals tend to wear rapidly in actuators serving as active mounts as the result of excessive friction between the elastomeric material and the cylinder mating surface. The friction may be characterized as "interlocking," which increases with roughness of a mating surface, and "adhesive," which increases with an increase in the contact area with the mating surface. Even when the smoothness of an elastomeric seal's mating surface is increased, the resulting decrease in interlocking friction is insufficient to offset the increase in the adhesive friction. A low friction seal is vital to reducing noise and vibration. Since the piston will move within the cylinder at the frequencies of the noise and vibration, a high seal friction will partially regenerate the shaking forces in the cylinder wall that are desired to be reduced. This is especially true for noise, which is characterized by already small disturbance forces.

Conventional spring-energized seals include a U-shaped jacket, often made of a low-friction polymer, and a U-shaped metal spring device disposed in the jacket. While the friction between the seal and the cylinder is low, in many actuator applications where transverse loads are applied to the piston rod, the seal stiffness is inadequate to prevent the piston from contacting the cylinder. When the piston contacts the cylinder, the cylinder can become abraded. The abrasions in the cylinder increase the wear rate of the seal, leading to premature failure of the seal and the actuator. Supporting the piston rod at one or two points along the rod's axis can prevent the piston from contacting the cylinder. For example, journal bearings through which the piston rod passes are routinely used for this purpose. However, a hydraulic actuator used for vibration control must have five unconstrained degrees of freedom. The use of any form of piston rod support, such as journal bearings, would reduce the number of degrees of freedom to two: translation along the piston rod's axis and rotation about that axis.

Piston rings are effective long-life seals but due to their high leakage rate are never used to support static loads, which constitute the majority of the load seen by an actuator in a helicopter application.

The size and weight of the actuator are also important to optimize performance. In airborne systems this is self-apparent. Large actuators increase the weight of the system, and accordingly, power consumption, when used on a helicopter. Additionally, the desire to place the actuator in series with a vibrating object and its support structure dictates a small size. The need for a small size is governed by the physics of vibration isolation using series actuators. All support structures have a characteristic stiffness that is presented to the vibrating object. Generally the support structure's stiffness is fixed, or can only be changed at great expense. To effectively isolate the vibrating object from the support structure, the stiffness presented to the vibrating object by the series actuator must be less then the support structure's own stiffness. Thus the actuator's stiffness must be measured relative to the supporting structure's stiffness. While airframes are very strong, they are not very stiff, as stiffness is generally gained via added weight. A small actuator can be placed closer to the interface between the vibrating object and the support structure, reducing the need for and length of support and mounting brackets. The use of such brackets has the effect of reducing the already low stiffness of the support structure. This in turn drives the actuator stiffness to be lower still. There are limits to how low the actuator stiffness can be made and still provide a stability margin against buckling under load.

For the foregoing reasons, there is a need for an active mount including a hydraulic actuator comprising a low-friction seal that minimizes leakage of hydraulic fluid from the cylinder and has adequate stiffness to maintain clearance between the piston and the cylinder when subjected to transverse loads. The new hydraulic actuator should withstand, without buckling, the significant loads generated when used in an active mount for the transmission of the main rotor system of a helicopter. Further, any transverse or rotational motions on the actuator should not induce high loads between the piston and the housing. A compact, relatively lightweight actuator is desirable in order to maximize reduction of noise and vibration transmission.

SUMMARY

Therefore, it is an object of the present invention to provide a hydraulic actuator including a low-friction seal that minimizes leakage of hydraulic fluid and has adequate stiffness to maintain clearance between the actuator's piston and cylinder when subjected to transverse loads.

A further object of the present invention is to provide a hydraulic actuator that is compact and relatively lightweight, and when incorporated into an active mount system provides maximum reduction of noise and vibration transmission between a vibrating component and a support structure.

It is also an object of the present invention to provide a hydraulic actuator that does not induce high loads between the piston and cylinder due to transverse motions and rotations at the point of attachment.

It is a further object of the present invention to provide a hydraulic actuator that does not cause the piston to bind in the cylinder due to transverse motions and rotations at the point of attachment.

It is still further an object of the present invention to provide a hydraulic actuator that does not buckle when subjected to high axial loads.

According to the present invention, a seal assembly is provided for use in sealing a void between two relatively moveable coaxial members, a hollow first member having a cylindrical inner surface, and a second cylindrical member movably disposed in the first member. The seal assembly is disposed in a groove in the second member, and includes an annular seal member comprising the polymer polytetrafluoroethylene (PTFE) resin. The inner edge of the seal member is disposed in the groove, and the seal member's outer edge contacts the inner surface of the first member to form a seal between the members. The seal assembly also includes backing rings on each side of the seal, and on one side, an annular compression spring in the groove between one of the backing rings and one edge of the groove. The spring exerts force axially to compress the seal member, impelling the seal member to increase in dimension radially and maintain the seal between the members.

Also according to the present invention, a seal assembly is provided that is disposed in a groove in the inside surface of a hollow first member, with the inner edge of a seal member contacting a cylindrical second member disposed inside the first member to form a seal. The seal assembly is of similar construction to that discussed above.

In further accordance with the present invention, a barrel-shaped piston is provided for use in a hydraulic actuator of the type including a cylinder, the piston movably disposed in the cylinder, and a piston rod assembly connected to the piston and extending from an end of the cylinder. A seal assembly is disposed in an annular groove at or near the midpoint of the piston. The piston is tapered towards each end from each edge of the groove, such that the diameter of the piston at each edge of the groove is greater than the diameter at each respective end of the piston. The piston's axial alignment can differ from that of the cylinder while allowing movement of the piston and maintaining the seal between the piston and the cylinder.

A hydraulic actuator is also provided that includes a cylindrical piston disposed in a casing with an hourglass-shaped inside surface. A seal assembly is disposed in an annular groove in the casing. The casing is tapered from each end toward each edge of the groove, such that the diameter of the casing at each edge of the groove shoulder is less than the diameter at each respective end of the casing. Again, the piston's axial alignment can differ from that of the casing while allowing movement of the piston and maintaining the seal between the piston and the casing.

In further accordance with the present invention, several active mounts for mounting a vibrating component to a support structure are provided for use in a system for reducing vibration transmission from the vibrating component to the support structure. Each active mount includes a housing adapted to be attached to one of the vibrating component or the support structure, and a hydraulic actuator disposed in the housing. The actuator comprises a cylinder, a piston movably disposed in the cylinder, and a piston rod assembly connected to the piston and extending from an end of the cylinder. In one active mount that is provided, a seal assembly according to the present invention as described above is disposed either in a groove in the piston or in a groove in the cylinder, and includes an annular seal member comprising polytetrafluoroethylene (PTFE) resin. One edge of the seal member is disposed in the groove, and the seal member's other edge contacts whichever one of the piston or cylinder that does not have the groove. The seal assembly also includes backing rings on each side of the seal, and on one side, an annular compression spring in the groove between one of the backing rings and one edge of the groove. The spring exerts force axially to compress the seal member, impelling the seal member to increase in dimension radially and maintain the seal between the piston and cylinder.

In another active mount that is provided, the actuator includes a barrel-shaped piston according to the present invention as described above, with a seal assembly disposed in an annular groove at or near the midpoint of the piston. Similarly, an active mount is provided where the actuator includes a cylindrical piston disposed in a casing with an hourglass-shaped inside surface, according to the present invention as provided above. A seal assembly is disposed in an annular groove in the casing. In both of these mounts, the piston's axial alignment can differ from that of the casing while allowing movement of the piston and maintaining the seal between the piston and the cylinder or casing.

In yet further accordance with the present invention, an active mount for mounting a transmission gearbox to an airframe of a rotary wing aircraft is provided that comprises a housing adapted to be attached to one of the gearbox or the airframe, and a hydraulic actuator disposed in the housing. The actuator includes a cylinder, a piston movably disposed in the cylinder, and a piston rod assembly connected to the piston and extending from an end of the cylinder. A seal assembly is disposed either in a groove in the piston or in a groove in the cylinder, and includes an annular seal member comprising PTFE resin. One edge of the seal member is disposed in the groove, and the seal member's other edge contacts whichever one of the piston or cylinder that does not have the groove. The seal assembly also includes backing rings on each side of the seal, and on one side, an annular compression spring in the groove between one of the backing rings and one edge of the groove. The spring exerts force axially to compress the seal member, impelling the seal member to increase in dimension radially and maintain the seal between the members.

The present invention features a seal assembly with backing rings that increase the stiffness of a PTFE seal and a compression spring that impels that PTFE seal to increase in radial dimension. The spring allows for volume expansion of the seal with temperature changes, without increasing the contact pressure between the seal and cylinder wall. This design for the seal also differs from convention in the art in that the seal is confined in all directions within the piston's groove. The PTFE seal is preferably bonded to one or more of the backing rings to further increase circumferential stiffness. A barrel-shaped piston or hourglass-shaped casing accommodate transverse movement between the support structure and mounted component. An elastomeric thrust bearing is part of the piston rod assembly, and is stiff along the piston rod assembly's thrust axis but flexible to transverse and rotational motions.

The seal assembly of the present invention provides a low-friction seal that minimizes leakage of hydraulic fluid. The seal has adequate radial stiffness to maintain clearance between the actuator's piston and cylinder when subjected to transverse loads. Cocking of the piston is permitted without binding by tapered walls of the piston or casing. Accordingly, transverse motions and rotations at the points of attachment do not induce high loads between the piston and cylinder, and the piston will not bind in the cylinder. The seal assembly maintains the seal between the piston and cylinder even when the piston is cocked. The hydraulic actuator is compact and lightweight. In an active mount system, the actuator will provide maximum reduction of noise and vibration transmission between a vibrating component and a support structure. The actuator is well suited to incorporation in systems such as on a mount for a helicopter main rotor.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

DRAWINGS

For the purpose of illustrating the invention, the drawings show preferred forms of the invention. However, it should be understood that this invention is not limited to the precise arrangements and instrumentalities shown in the drawings.

DESCRIPTION

While the invention will be described in connection with one or more preferred embodiments, it will be understood that it is not intended to limit the invention to those embodiments. On the contrary, it is intended that the invention cover all alternatives, modifications and equivalents as may be included within the spirit and scope of the invention as defined by the appended claims.

Certain terminology is used herein for convenience only and is not to be taken as a limitation on the invention. For example, words such as "upper," "lower," "left," "right," "horizontal," "vertical," "upward," and "downward" merely describe the configuration shown in the Figures. Indeed, the components may be oriented in any direction and the terminology, therefore, should be understood as encompassing such variations unless specified otherwise.

Figure 1:
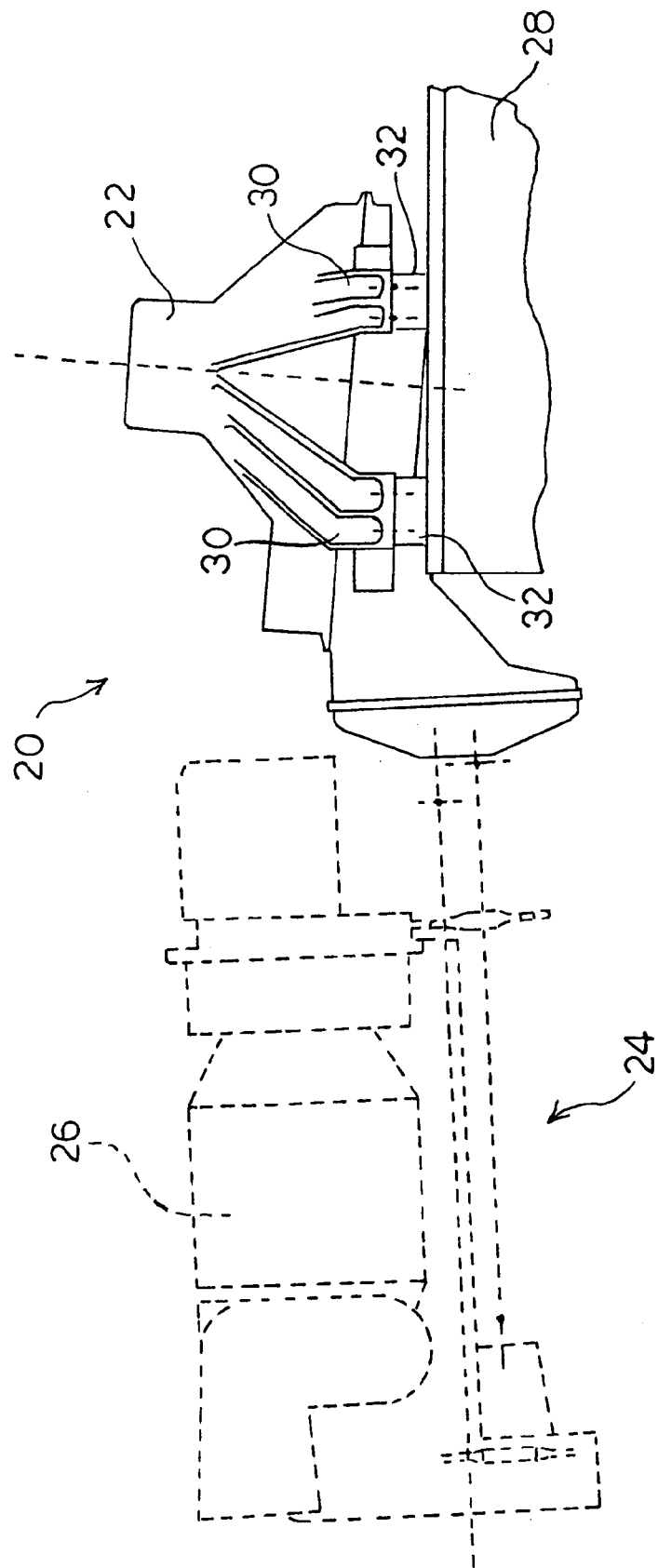
FIG. 1 is a schematic representation of a helicopter transmission arrangement incorporating the present invention.

Referring now to the drawings, wherein like reference numerals illustrate corresponding or similar elements throughout the several views, FIG. 1 illustrates a transmission arrangement 20 for a helicopter. The transmission arrangement 20 includes a gearbox 22 that is connected to a helicopter rotor head (not shown). The gearbox 22 is also connected to the drive train 24 of the helicopter's engine 26. The gearbox 22 is supported by an airframe comprising a structural element 28. The gearbox 22 includes a plurality of mounting feet 30 that are attached to the airframe structure 28. In accordance with the present invention, active transmission mounts (ATMs) 32 are mounted in series between each gearbox mounting foot 30 and the airframe structure 28 for isolating the mounting feet 30 of the main rotor gearbox 22 from the airframe 28.

Figure 2:
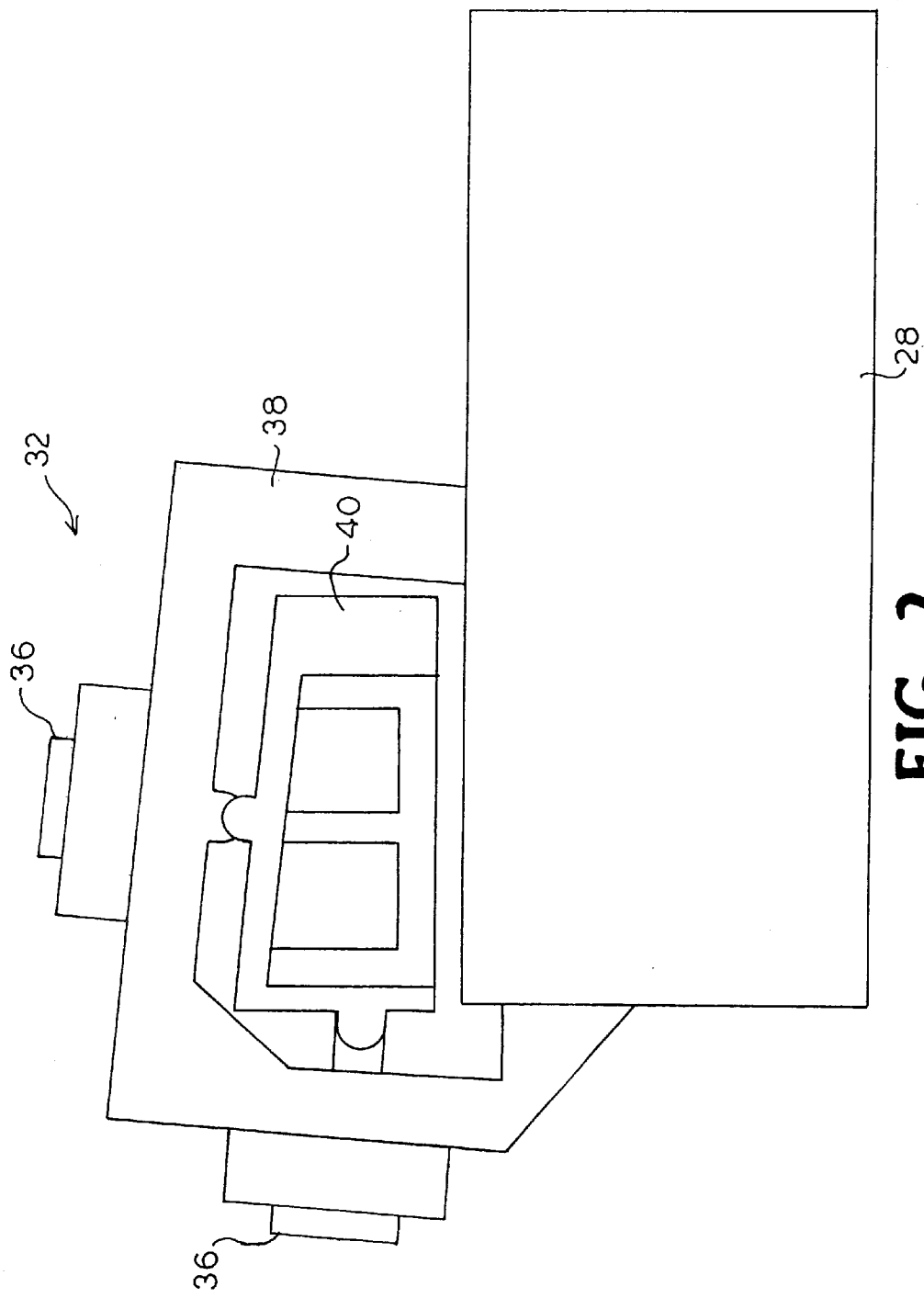
FIG. 2 is a schematic representation of an active transmission mount according to the present invention connected to an aircraft frame and transmission gearbox foot.

According to the present invention, the ATM 32 is a part of an active transmission mount system. Such an active transmission mount system is disclosed in U.S. Patent Application No. 60/233,308, filed on Sep. 15, 2000, the contents of which are hereby incorporated by reference. As shown schematically in FIG. 2, the ATM system includes one or more hydraulic ATM actuators 36 associated with each of four ATMs 32 that are distributed in general symmetric alignment around the gearbox 22. Each ATM actuator 36 includes a piston and cylinder, described in further detail below.

Figure 3:
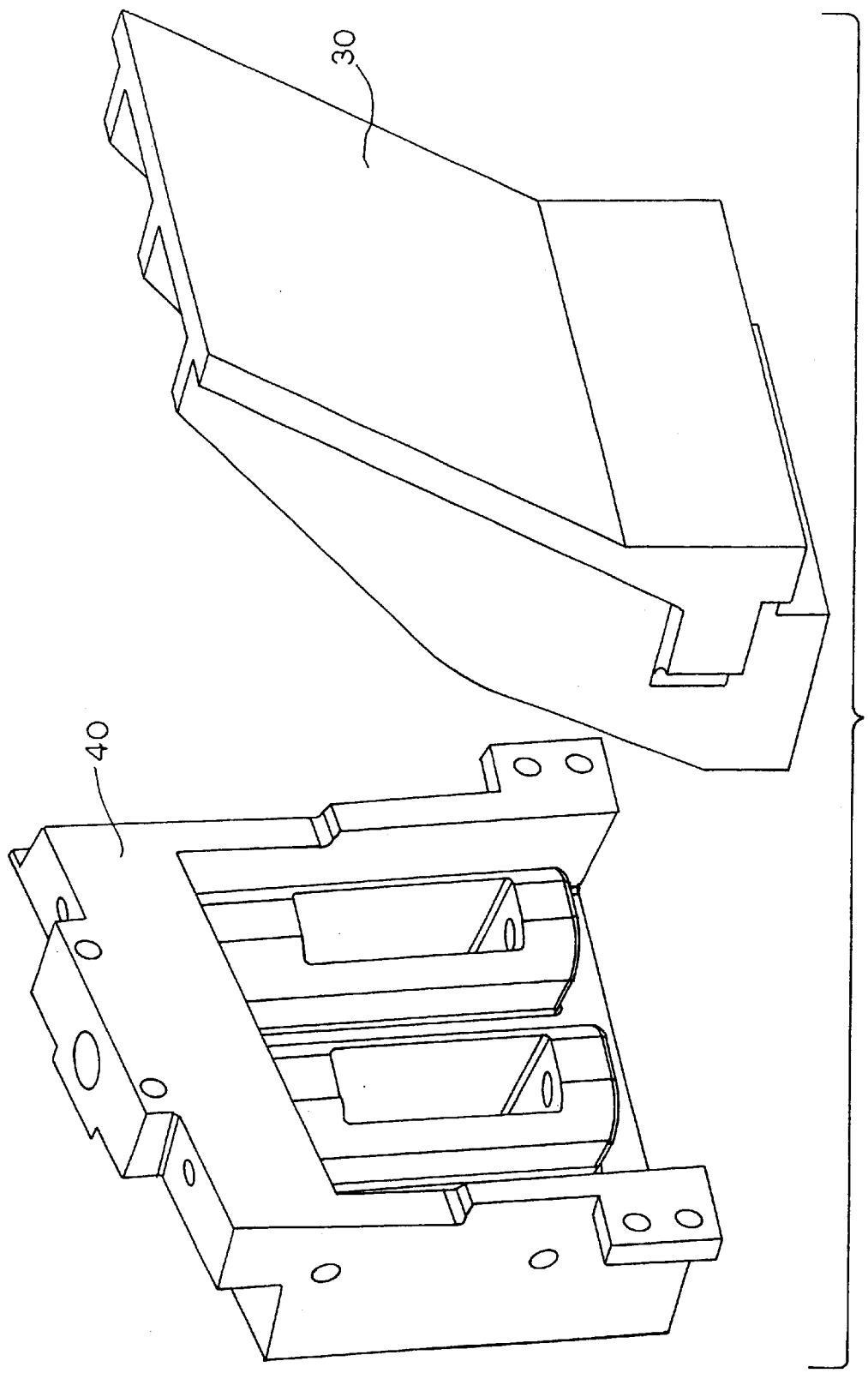
FIG. 3 is an exploded view of the transmission gearbox foot and foot attachment for the active transmission mount shown in FIG. 2.
Figure 4:
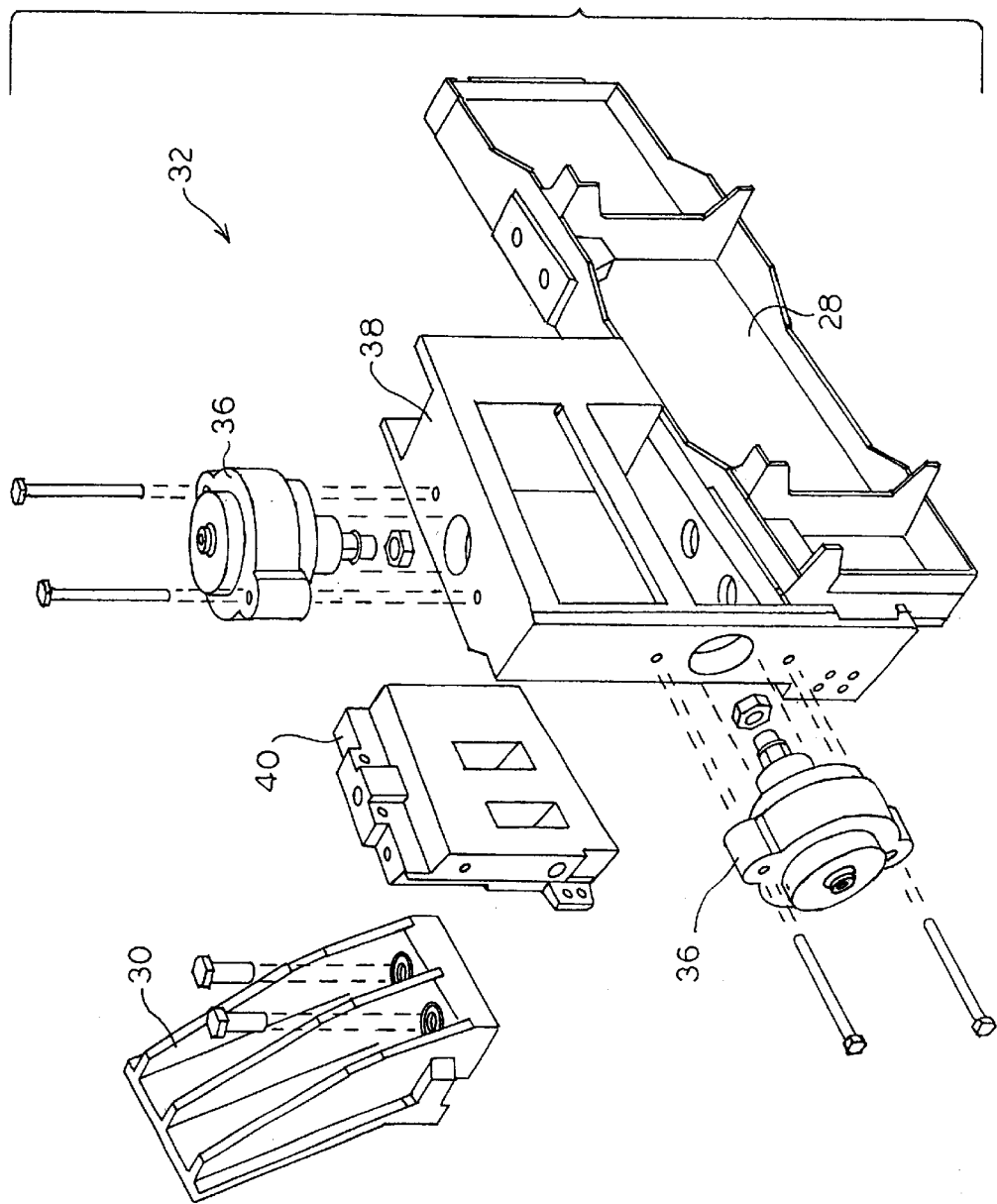
FIG. 4 is an exploded view of an active transmission mount according to the present invention connected to an aircraft frame and transmission gearbox foot.

The mounting foot 30 is connected to the ATM 32 and the ATM is connected to the airframe 28. The ATM 32 also comprises an isolation frame 38 and a foot attachment 40. The isolation frame 38 is fixed to the helicopter's airframe 28 and surrounds the foot attachment 40. As shown in the exploded view of FIG. 3, the gearbox mounting foot 30 is connected directly to the foot attachment 40. The foot attachment 40 is suspended from the isolation frame 38 by two ATM actuators 36 mounted on the isolation frame, as shown in the exploded view of FIG. 4. One ATM actuator 36 is shown positioned substantially vertically on top of the isolation frame 38 and controls the vertical movement of the foot attachment 40. However, depending on the mounting configuration, the vertical ATM actuator 36 could also be located below the mounting foot 30. The other ATM actuator 36 is positioned substantially horizontally on a side of the isolation frame 38 and substantially parallel to the longitudinal axis of the helicopter for controlling the horizontal movement of the foot attachment 40. The ATM 32 structurally isolates the foot attachment 40, and thus the gearbox foot 30, from the airframe 28.

Figure 5:
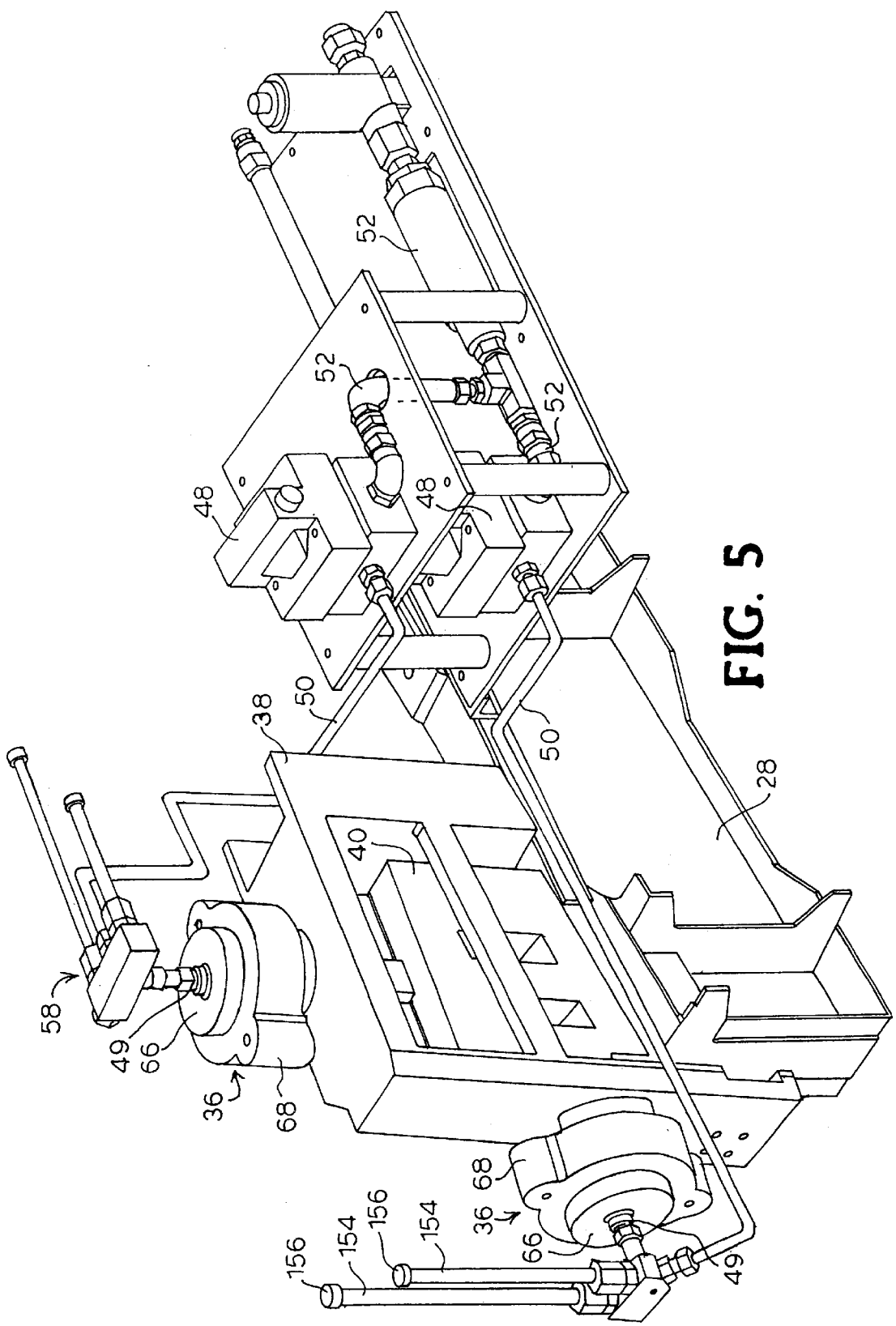
FIG. 5 is a cutaway perspective view of a hydraulic actuation system for a gearbox mounting foot incorporating an active transmission mount according to the present invention.
Figure 6:
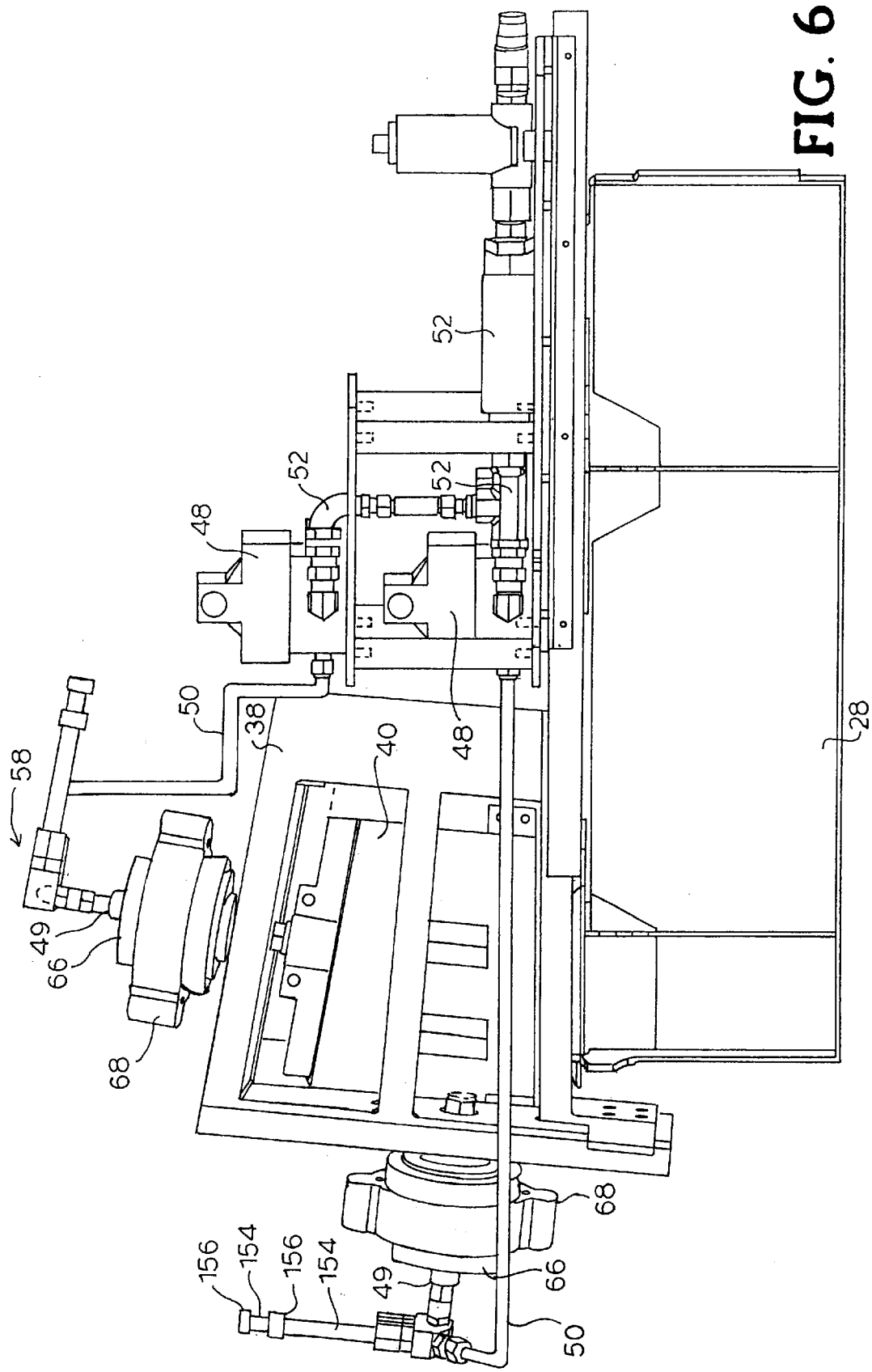
FIG. 6 is side elevation view of the hydraulic actuation system shown in FIG. 5.

A preferred arrangement of the ATM 32 with associated hydraulic valves 48 according to the present invention is shown in detail in FIGS. 5 and 6 relative to one of the aft mounting feet 30. Each ATM actuator 36 has a dedicated valve 48. This electrohydraulic valve 48 is electrically connected to a controller via a control line for supplying current to the valve 48. For example, the hydraulic inputs 49 of the actuators 36 are connected to hydraulic fluid lines 50, which are connected to the hydraulic control valves 48. The valves 48 open and close in response to output control signals to provide a vibratory flow of high-pressure hydraulic fluid from a fluid source (not shown) to and from the actuators 36.

The active transmission mount system acts to isolate the vibratory and acoustic loads generated by the main rotor gearbox 22 from the airframe. The ATM system achieves vibration reduction by controlling the applied fluid flow within the ATM actuators 36, and thus the hydraulic pressure acting on the pistons in the actuators 36. A quasi-steady pressure is applied to each actuator 36 to react to the applied quasi-steady flight and maneuvering loads. The vibratory loads that are applied along the actuator's principle, or "active", axis are transmitted into the hydraulic column. This causes cancellation of pressure fluctuations that would otherwise be transmitted into the airframe causing vibration if left unaltered. Generally, an increase in hydraulic pressure on the pistons when a vibratory load pushes on the actuator 36 is relieved by the ATM system by removing fluid, and a decrease in hydraulic pressure when a vibratory load pulls on the actuator 36 is accommodated by the ATM system by increasing hydraulic fluid flow to the actuator 36. Hence, the actuator 36 is operated by removing and supplying a sufficient amount of hydraulic fluid against the head of the piston to allow the piston to translate in substantially the same direction and at substantially the same frequency as the vibrating gearbox 22. By oscillating hydraulic fluid flow in this way, the ATM system allows relative motion between the gearbox 22 and the airframe 28 at low vibration frequencies, typically greater than about 2 Hz, so that the gearbox 22, in effect, floats in a dynamic sense with respect to the airframe, but maintains a steady, static position relative to the airframe 28. As a result, vibratory pressure is minimized, thereby reducing the transfer of vibration related to the applied rotor vibratory loads from the ATM 32 to the airframe 28.

Quasi-static flight loads and displacements, however, must be transmitted to the airframe 28. The applied quasi-static flight loads can change in magnitude and direction at frequencies up to 2 Hz depending on pilot inputs into the aircraft. Hence, the actuator 36 must be designed to accommodate the transmission of these large quasi-static flight loads. The magnitude of these loads can be quite high, approximately representing the aircraft weight amplified by the maneuver the aircraft is undergoing. For example, in a Sikorsky Aircraft Corporation S-76® aircraft, the quasi-static flight loads have a magnitude of about 8000 lbs. on each actuator 36 ("SIKORSKY" is a registered trademark of the Sikorsky Aircraft Corporation and "S-76" is a registered trademark of United Technologies Corporation). The ATM actuator 36 must be designed to accommodate such loads while limiting gearbox motions to only about ±0.050 inches about a static position in order to avoid excessive misalignment of the engine transmission shaft. The ATM actuator 36 according to the present invention is also designed to prevent transmission to the airframe 28 of small vibratory loads, e.g., 500 lbs. between about 16 Hz and about 50 Hz. These are the vibratory loads that cause the vibrations that are the most bothersome to the passengers and crew within the aircraft.

The actuator 36 is also designed to passively isolate the vibratory and acoustic loads that are applied transverse to the central longitudinal, or "active", axis of the actuator. This is achieved by designing the actuator 36 so that the transverse stiffness of the actuator is low through the use of elastomeric bearing elements, discussed in greater detail herein below. Due to the configuration of the two actuators 36 at each foot 30, each actuator's transverse axis is the other actuator's active axis. Thus, the actuator's 36 transverse axis may be passive because the other actuator 36 accommodates a particular load along that axis.

Also as seen in FIGS. 5 and 6, the actuation system preferably includes a passive noise isolator 58. The passive isolator 58 introduces softness into the hydraulic system at predetermined frequencies to allow the system to attenuate high frequency (e.g., greater than 500 Hz) and low amplitude, 1/1000 inch, noise that is otherwise transmitted by the gearbox feet 30 to the ATM 32 causing high frequency noise in the fluid lines 50 which, in turn, leads to noise in the aircraft. In order to reduce this high frequency noise, the hydraulic line 50 is connected to the passive isolator 58. The passive isolator 58 may comprise, for example, tuned stubs as disclosed in U.S. Patent Application No. 60/233,308. Other hydraulic lines 52 that interconnect the valves 48 and their associated actuators 36 are also connected to passive isolators (not shown).

According to the present invention, a system analysis is performed to determine the ATM actuator 36 placement, orientation and size (piston diameter). The actuator 36 placement, orientation and size is determined principally by the static loads between the transmission 22 and the airframe 28 needed to keep the relative position of the transmission and the airframe constant at maneuvering frequencies, which are effectively static. The actuators 36 must supply these loads under all operating conditions. In addition, the actuators 36 must respond to aircraft dynamic loads. Preferably, the actuators 36 should be no larger than necessary, as large actuators result in added weight and power consumption. The actuator configuration selected should use a minimum number of actuators to minimize system cost and maximize system reliability. And, to simplify actuator design in applications where the actuator is subject to large static loads in one known direction, the actuators are preferably single-acting hydraulic pistons, but double-acting pistons may also be used in accordance with the present invention for a more generally applicable design.

Figure 7:
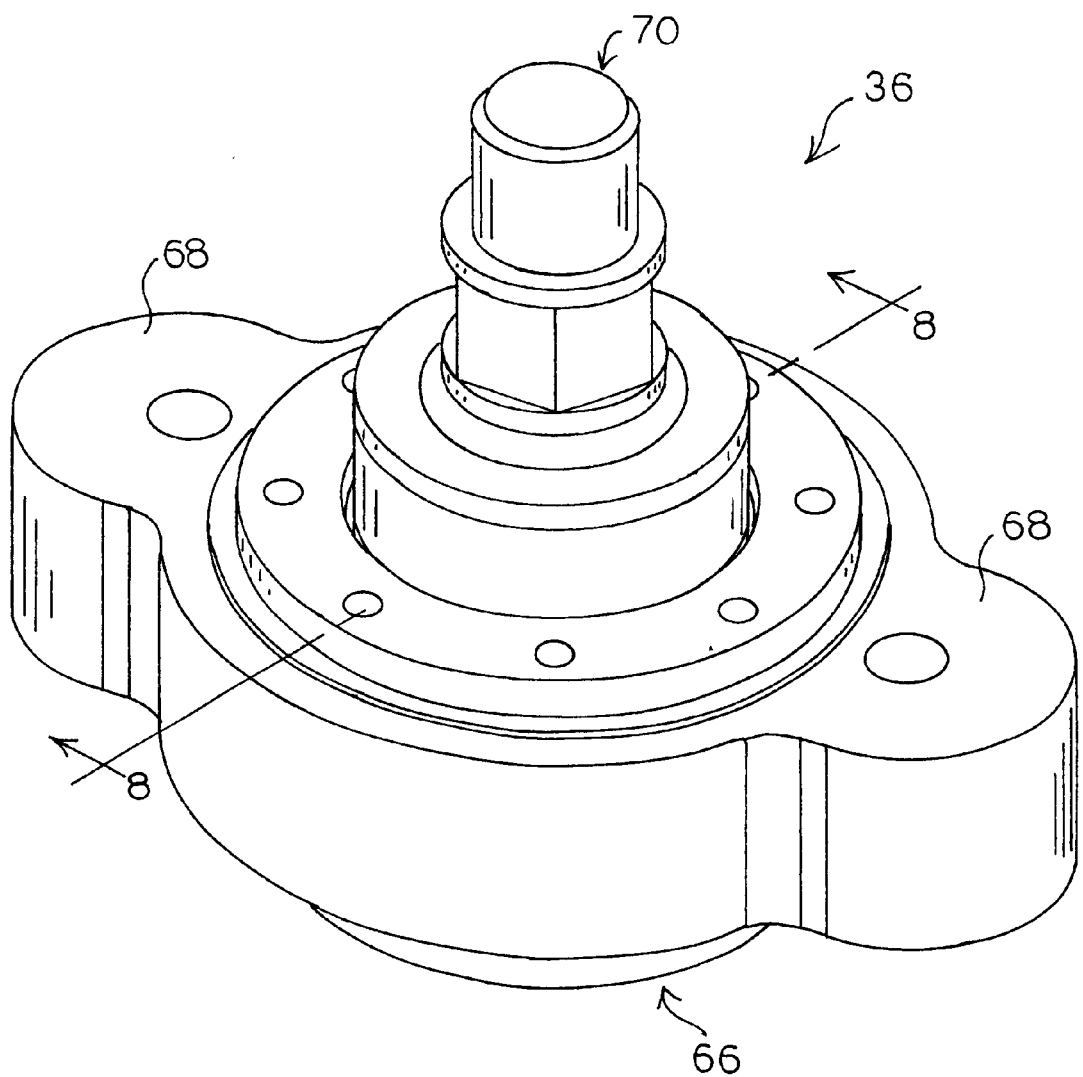
FIG. 7 is an isometric view of an actuator according to the present invention.

A preferred hydraulic ATM actuator 36 for use in accordance with the present invention is shown in FIG. 7. The actuator 36 includes a casing 66 with a mounting flange 68 for housing and attaching the actuator 36 to the airframe or a support structure. A piston rod assembly 70 is configured to attach to the gearbox foot attachment 40. Other methods of attachment may be used with the present actuator 36.

Figure 8:
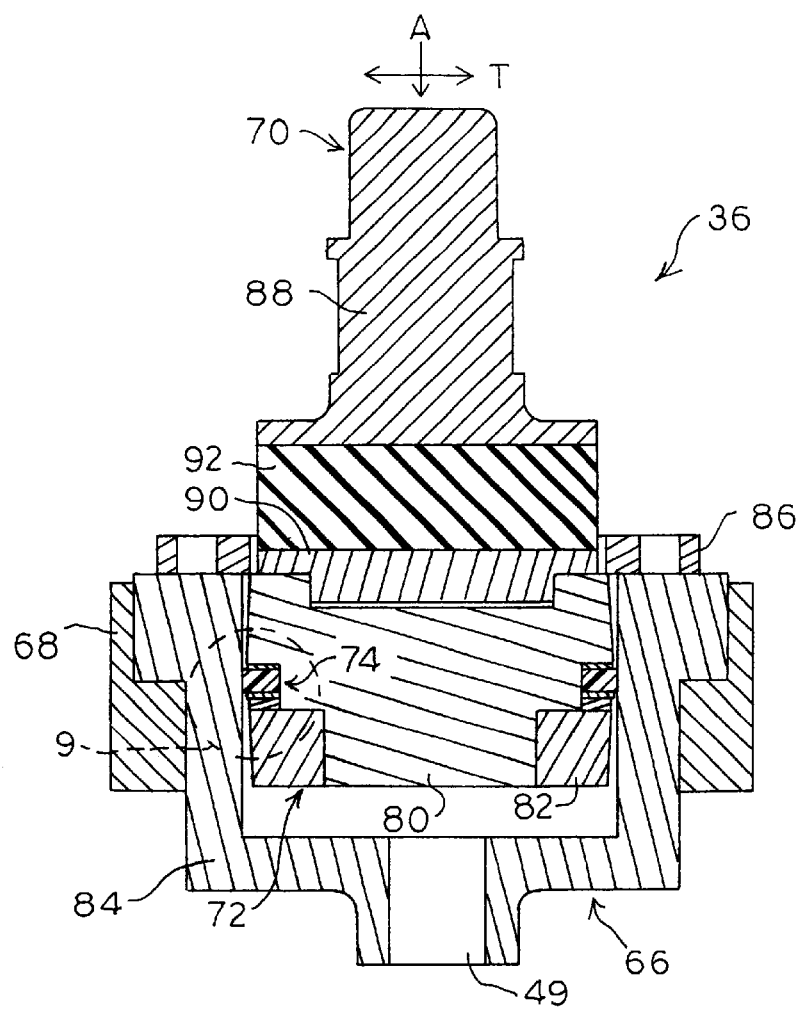
FIG. 8 is a cross-sectional view of one embodiment of the actuator shown in FIG. 7 taken along line 8—8.
Figure 9:
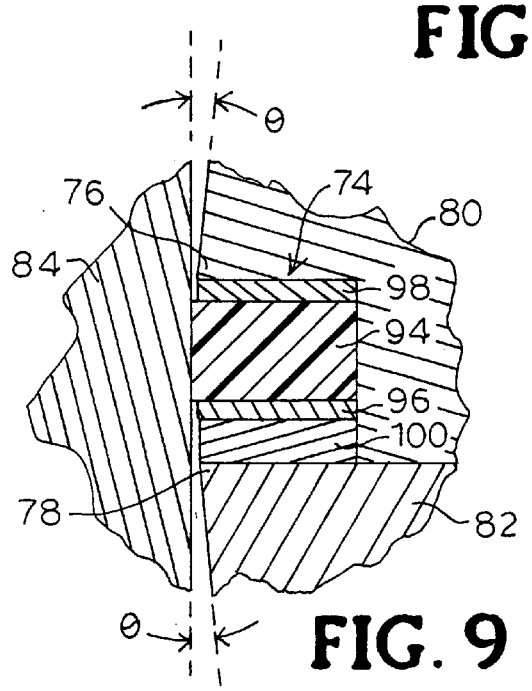
FIG. 9 is an enlarged detail of a seal assembly and barrel-shaped piston of FIG. 8.
Figure 10:
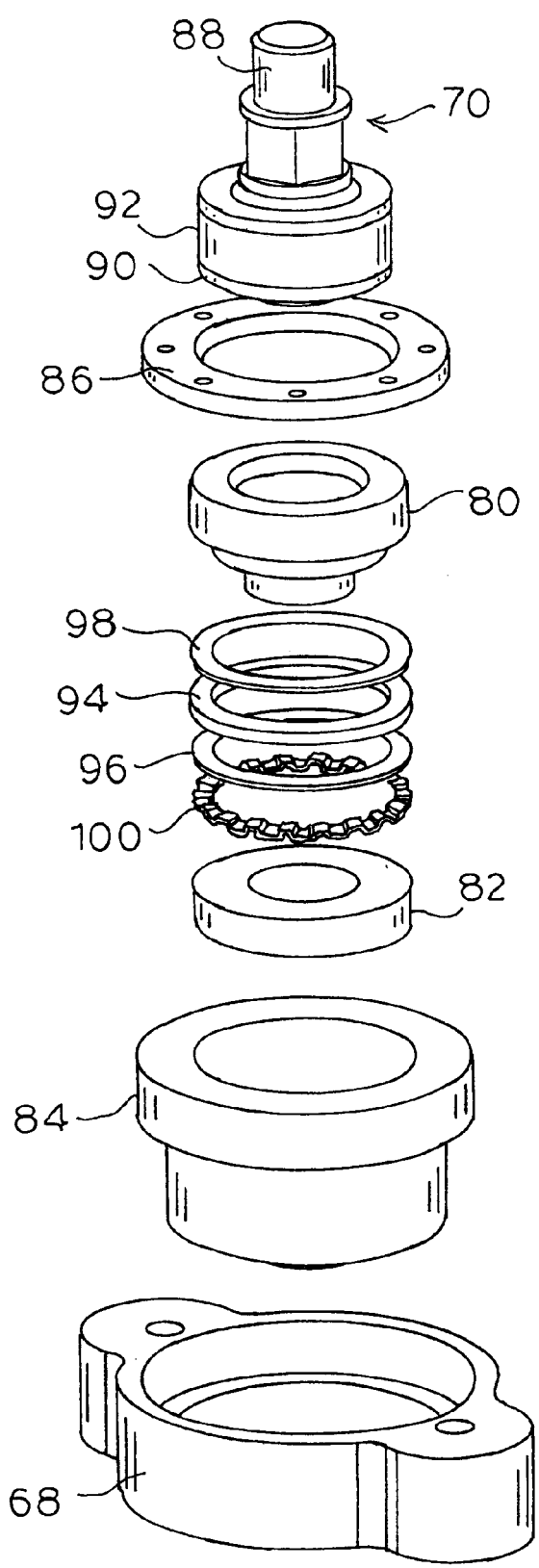
FIG. 10 is an exploded view of the actuator shown in FIG. 8.

Referring to FIGS. 8, 9, and 10, in addition to the casing 66, mounting flange 68, and piston rod assembly 70, the actuator 36 includes a piston 72 and a seal assembly 74. The piston 72 is barrel-shaped and has an annular groove at or near its midpoint in which the seal assembly 74 resides. Shoulders 76, 78 axially define the groove, and are the points on each half of the piston 72 with the greatest diameter. The diameter tapers towards each end of the piston 72, where the diameter is the least. The angle of the taper θ may be as great as desired within the mechanical limits of the piston 72 material, but is preferably up to eight degrees, and approximately five degrees. To facilitate construction of the piston 72 and seal assembly 74, two pieces 80, 82 are used to make the piston 72, and are assembled, for example, with a press-fit or screw thread. The piston 72 is adapted to slide within the casing 66 and is attached to the piston rod assembly 70.

The casing 66 includes a hollow bottom portion 84 with a cylindrical interior surface and with one substantially closed end and one open end, and a retaining ring 86 fastened to the open end. The bottom portion 84 has an opening that is the hydraulic connection 49 for the actuator 36. The retaining ring 86 has an inside edge with a diameter that is smaller than the diameter of the inside surface of the bottom portion 86 and the diameter of the end of the piston 72, providing a positive stop to retain the piston 72 in the casing 66.

The piston rod assembly 70 includes a mounting member 88, a mounting plate 90, and an elastomeric bearing 92 interposed therebetween. The mounting member 88 is exemplarily a threaded stud with associated hardware, and is connectable to the gearbox foot attachment 40. The mounting plate 90 is attached to the upper end of the piston 72, for example, by a press-fit, or alternatively may be formed as part of the piston 72.

The bearing 92 is mounted below the stud 88 and is preferably a substantially planar elastomeric thrust bearing. Elastomeric thrust bearings are well known in the art and generally comprise alternating layers of elastomer and non-resilient metal shims (not shown). The number of elastomer layers and shims is determined by the applied loads and desired flexibility of the elastomeric bearing. A suitable bearing for use in the present invention is manufactured by Lord Corporation of Cary, N.C., U.S.A. The bearing 92 is designed to be stiff, or rigid, in the axial direction and soft, or flexible, in the lateral or transverse direction. In one preferred embodiment, the bearing 92 has an axial stiffness greater than about 300,000 lbf/in, and a transverse stiffness less than about 1,000 lbf/in. The bearing 92 is preferably located between and attached to the inner end of the stud 88 and the outer end of the mounting plate 90. The attachment of the bearing 92 is through any conventional means, such as an elastomer to metal adhesive.

The casing 66, mounting flange 68, piston 72, mounting member 88, and mounting plate 90 are made of metal, exemplarily steel, although any metal with the desired strength and other material characteristics may be used. It may be preferable, however, for the piston 72 in particular to be made of a material that is softer than the casing 66 material. Materials such as brass or non-hardened steel may be considered for the piston 72, while a smooth, polished, hardened steel is preferred for the interior surface of the casing 66. Such a material selection minimizes gouging of the casing 66 that could occur if the piston 72 strikes the casing 66. Materials and dimensions depend on the particular application and may be selected by someone of ordinary skill in the art. The scope of the invention is not intended to be limited by the materials listed herein, but may be carried out using any materials that allow the construction and operation of the described actuators and their components.

As shown in FIG. 9, the seal assembly 74 comprises a seal member 94, backing rings 96, 98 on either side of the seal 94, and an annular compression spring 100 between one of the backing rings 96, 98 and one of the shoulders 76, 78 that defines the groove in the piston 72. The seal assembly 74 provides a low-friction seal between the piston 72 and the casing 66. The seal 94 is an annular ring comprising polytetrafluoroethylene resin, or PTFE, which is marketed as TEFLON® ("TEFLON" is a registered trademark of E. I. du Pont de Nemours and Company). The seal 94 is shown as rectangular in cross-section, but alternatively could be circular or have rounded edges. Rounded edges allow for greater rotation of the piston 72 within the casing 66.

The seal 94 contacts both the piston 72 and the casing 66, and is stiff enough to prevent the piston 72 from contacting the casing 66. Prior to installation of the seal 94 within the casing 66, the diameter of the outside edge of the seal 94 is preferably between 0.001-inch to 0.005-inch greater than the inside diameter of the casing 66. The difference between the seal 94 outside diameter and the casing 66 inside diameter depends on the application, as again may be determined by someone of ordinary skill in the art. Specifically, some of the factors that should be considered in design include the radial and axial thickness of the seal 94, the inside diameter of the casing 66, the stiffness of the compression spring 100, the desired degree of friction between the casing 66 and the seal 94, the maximum differential pressure across the seal 94 and the allowable leakage of hydraulic fluid, and the operating temperature range of the actuator 36. In general, such seals are used at pressures of up to 3000 psi. Fillers, for example, bronze or graphite, may be used with PTFE to make the seal 94 as appropriate to minimize seal abrasion. Any leakage of hydraulic fluid may be handled in a manner known to those of ordinary skill in the art, or in accordance the invention disclosed in U.S. Patent Application No. 60/233,308, previously incorporated by reference herein.

The backing rings 96, 98 are on each side of the seal 94, and are annular with a substantially rectangular cross-section. The outer diameter of each ring 96, 98 is from approximately 0.002-inch to approximately 0.010-inch smaller than the inside diameter of the casing 66, and is preferably approximately 0.005-inch smaller. The backing rings 96, 98 are metal, preferably steel, but depending on the application may be made of other materials, such as stiff, high-strength plastics with low thermal expansion properties. Preferably at least one of the backing rings 96, 98, preferably the backing ring 98 on the opposite side of the seal 94 than the compression spring 100, is bonded to the seal 94. The bonding is performed in accordance with known methods of bonding PTFE to metal, "activating" the surface of the PTFE that is to be bonded to allow adhesion. The bonded backing ring increases the shear stiffness of the seal 94, which helps in preventing the piston 72 from contacting the casing 66.

The compression spring 100 is annular with approximately the same dimensions as the backing rings 96, 98, and is preferably a metal, exemplarily steel. The compression spring 100 exerts an axial force between the shoulders 76, 78 of the piston 72, impelling the seal 94 to increase in dimension radially and maintain sealing contact with the piston 72 and the casing 66. PTFE has a fairly large volume thermal expansion coefficient compared to a metal which might comprise the piston 72. The compression spring 100 allows for the increase in seal volume with temperature without an increase in the radial contact force between the seal 94 and the casing 66. Material expansion must be accounted for as the seal 94 is tightly confined within the groove of the piston 72. The tight confinement provides the seal's 94 high radial stiffness which prevents the piston 72 from contacting the casing 66.

As described above, the actuator 36 undergoes both axial and transverse loads and motions. The loads and motions applied by the transmission foot 30 to the actuator 36 through the stud 88 comprise an axial quasi-static load and vibratory motion along "A", and transverse vibratory motion along "T". With the quasi-steady axial load on a typical S-76® aircraft manufactured by Sikorsky Aircraft Corporation of approximately 8,000 pounds, the vibratory motion along "A" and "T" is approximately ±0.050 inches, which stems from allowing the transmission to move in its own inertial frame. The transverse vibratory motion produces a transverse vibratory load transmitted to the airframe whose magnitude is governed by the inherent stiffness of the elastomeric bearing assembly. In the S-76® aircraft, this load is about 75 pounds. The combined axial loads and transverse motions result in a shear loading and a moment loading on the actuator 36. The shear and moment loads on the actuator 36 cause transverse loads and cocking moments on the piston 72. The barrel-shaped piston 72 and the seal assembly 74 with the PTFE seal 94 will accommodate the shear and moment loads applied to the actuator 36 by the gearbox foot 30.

Figure 11:
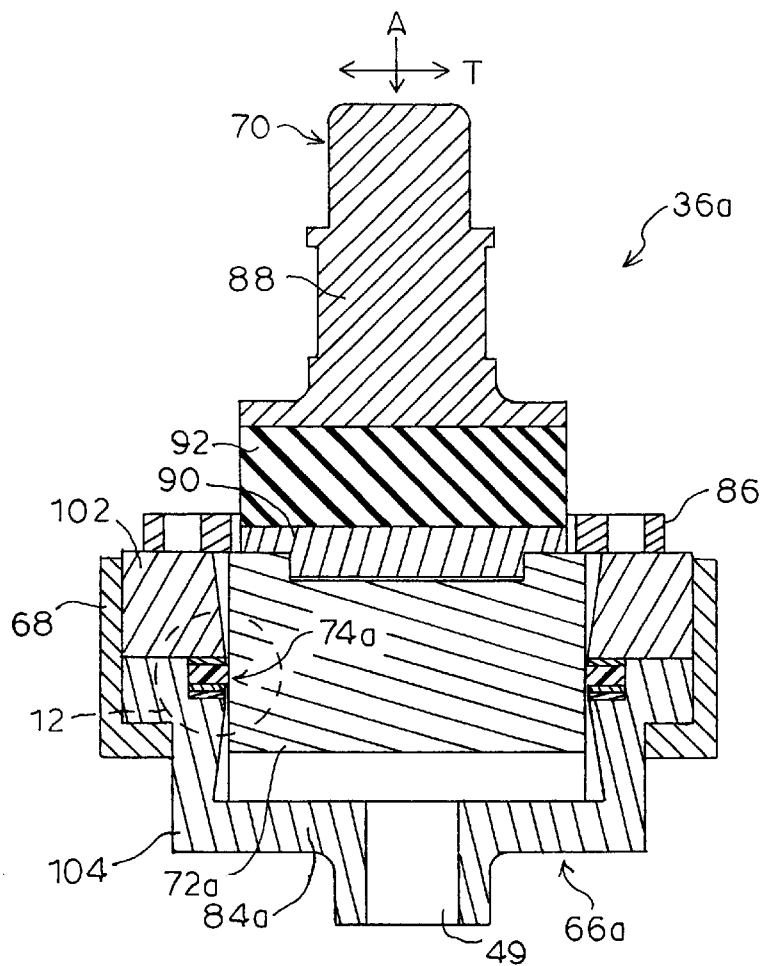
FIG. 11 is a cross-sectional view of another embodiment of the actuator shown in FIG. 7 taken along line 8—8.
Figure 12:
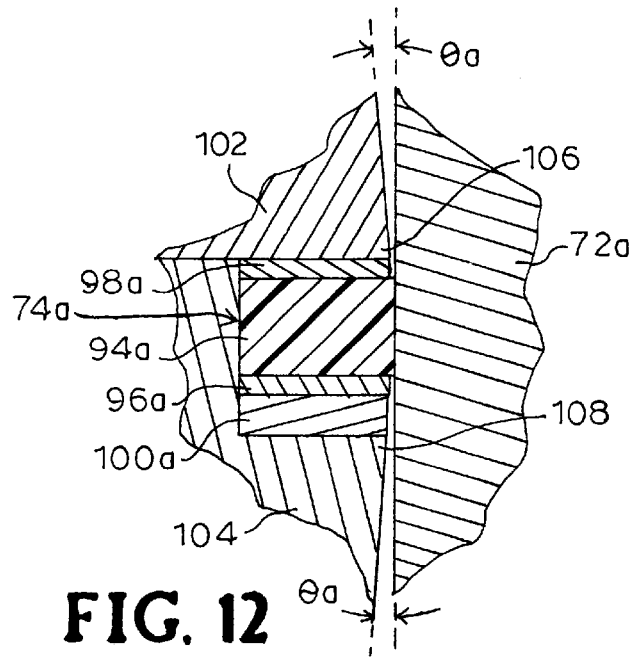
FIG. 12 is an enlarged detail of a seal assembly and hourglass-shaped casing of FIG. 11.
Figure 13:
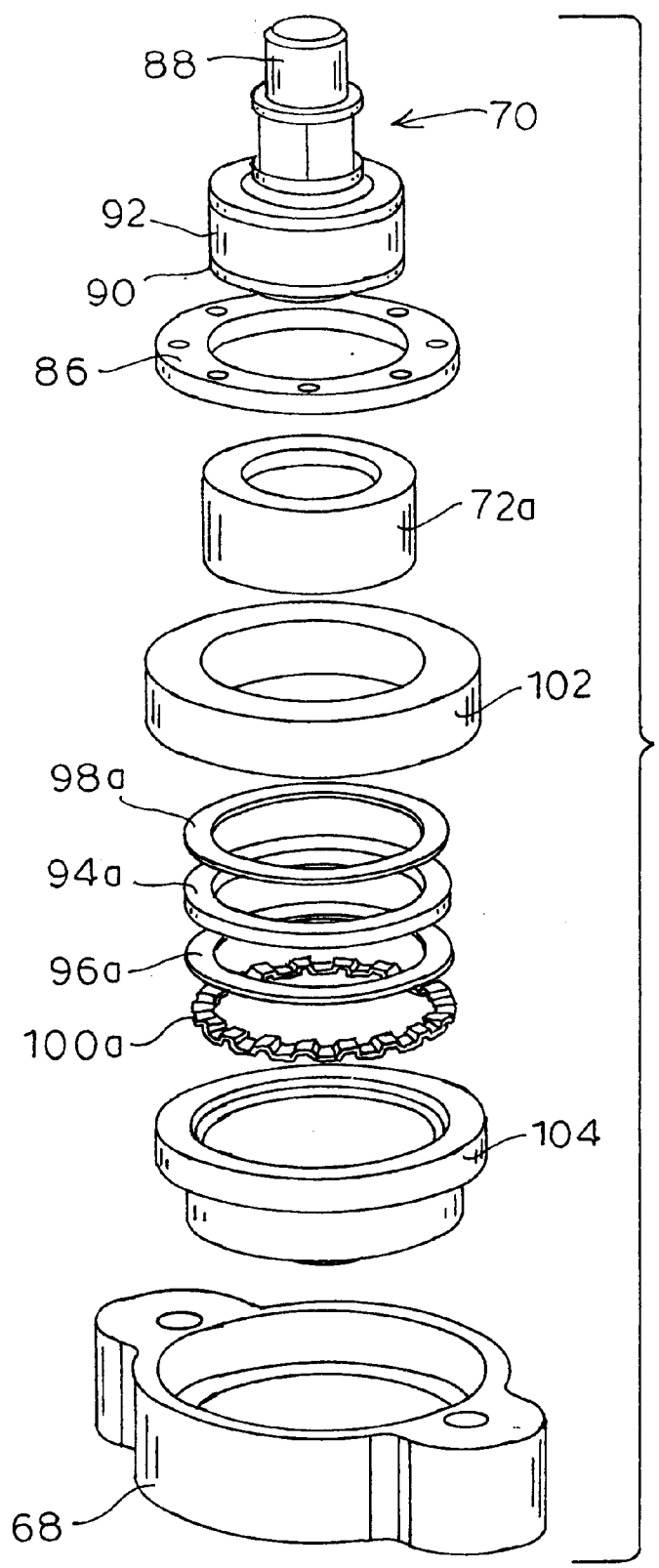
FIG. 13 is an exploded view of the actuator shown in FIG. 11.

FIGS. 11, 12, and 13 show another embodiment of an actuator 36a according to the present invention. In the Figures herein, unique features receive unique numbers, while features that are the same in more than one drawing receive the same numbers throughout. Where a feature is modified between figures, a letter is added or changed after the feature number to distinguish that feature from a similar feature in a previous figure. In this embodiment 36a, seal assembly 74a is disposed in a groove in the casing 66a. The casing 66a is hourglass-shaped, and to facilitate installation of the seal assembly 74a, the bottom portion 84a is constructed in two pieces, 102, 104. The inside surface of the casing 66a tapers from its largest diameters at each end to the narrowest diameter at shoulders 106, 108 that define the groove. The taper angle θa is the same as that for the previously described embodiment of an actuator 36. The piston 72a is a cylinder of substantially constant diameter.

Dimensional requirements are reversed from the previous embodiment of an actuator 36. Prior to installation of the piston 72a through the seal 94, the diameter of the inside edge of the seal 94a is preferably between 0.001-inch to 0.005-inch less than the outside diameter of the piston 72a. The inside diameter of each ring 96a, 98a is from approximately 0.002-inch to approximately 0.010-inch larger than the outside diameter of the piston 72a, and is preferably approximately 0.005-inch larger. The material selection for each part is similar to that for the previously described embodiment of the actuator 36. In the present embodiment of the actuator 36a, the hourglass-shaped piston 72a and the seal assembly 74a with the PTFE-seal 94a accommodate the shear and moment loads applied to the actuator 36a by the gearbox foot 30.

The present invention provides a novel actuator for reducing vibrational and noise transmission from a helicopter gearbox footing to the airframe. The ATM system will prospectively provide reductions of about 13 dB in cabin noise and about 25 dB in vibrations, similarly to the invention disclosed in the previously referenced U.S. Patent Application No. 60/233,308. In addition, the present actuator 36, 36a will accommodate shear and moment loads by allowing transverse deflection of the piston 72, 72a while maintaining pressure in the casing 66, 66a and minimizing leakage of hydraulic fluid between the piston and casing by use of a novel seal assembly 74, 74a. While the invention is illustrated and described as being used for reducing vibration and noise transmission from a gearbox foot 30 to an airframe 28, it is not limited to that application. On the contrary, the present invention can be used to address vibration and noise transmissions from a variety of other components in various types of machines and aircraft. Components of the invention may be used separately or in combination to achieve desired goals. For example, the seal assembly 74, 74a may be used to seal between cylindrical components that lack tapered walls. The barrel-shaped piston 72, 72a and hourglass-shaped casing 66, 66a may be used with conventional elastomeric seals.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A seal assembly for use in sealing a void between a hollow first member having a cylindrical inner surface and a cylindrical second member coaxially disposed at least in part within and moveable relative to the first member, the second member having an outer surface radially spaced from the first member inner surface, the second member having an annular peripheral groove axially defined by a first shoulder and a second shoulder, the seal assembly comprising:

an annular seal member comprising PTFE resin and having an inner edge and an outer edge, the seal member adapted to be disposed in the groove in the second member so that the inner edge surface of the seal member contacts the second member, and the outer edge surface contacts the inner surface of the first member, placing the first and second members in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder, wherein the second member's axial alignment can differ over a range of angles from that of the first member while allowing movement of the second member and the spring exerts force axially between the shoulders to compress the seal member, impelling the seal member to increase in dimension radially and maintain the tight sealing contact between the respective inner and outer surfaces of the first and second members.

2. The seal assembly as recited in claim 1, wherein the first backing ring is bonded to the seal member.

3. The seal assembly as recited in claim 1, wherein the second backing ring is bonded to the seal member.

4. The seal assembly as recited in claim 1, wherein the first member is rotatably moveable relative to the second member.

5. The seal assembly as recited in claim 1, wherein the first member is axially moveable relative to the second member.

6. The seal assembly as recited in claim 1, wherein the diameter of the outer edge of the first backing ring and the diameter of the outer edge of the second backing ring are from about 0.002-inch to about 0.010-inch less than the inside diameter of the first member.

7. The seal assembly as recited in claim 1, wherein the diameter of the outer edge of the seal member approximately from 0.001-inch to 0.005-inch greater than the inside diameter of the first member prior to installation of the seal member in the first member.

8. A seal assembly for use in sealing a void between a hollow first member having a cylindrical inner surface and an annular groove in its inner surface axially defined by a first shoulder and a second shoulder, and a cylindrical second member coaxially disposed at least in part within and moveable relative to the first member, the second member having an outer surface radially spaced from the first member inner surface, the seal assembly comprising:

an annular seal member comprising PTFE resin and having an inner edge and an outer edge, the outer edge adapted to be disposed in the groove in the first member so that the outer edge surface of the seal member contacts the first member, and the inner edge surface contacts the second member outer surface, placing the first and second members in tight sealing contact;

an annular first backing ring adapted to be disposed substantially in the groove and between the seal member and the first shoulder;

an annular second backing ring adapted to be disposed substantially in the groove and between the seal member and the second shoulder, and an annular compression spring adapted to be disposed substantially in the groove and between the first backing ring and the first shoulder, wherein the second member's axial alignment can differ over a range of angles from that of the first member while allowing movement of the second member and the spring exerts force axially between the shoulders to compress the seal member, impelling the seal member to increase in dimension radially and maintain the tight sealing contact between the respective inner and outer surfaces of the first and second members.

9. The seal assembly as recited in claim 8, wherein the first backing ring is bonded to the seal member.

10. The seal assembly as recited in claim 8, wherein the second backing ring is bonded to the seal member.

11. The seal assembly as recited in claim 8, wherein the first member is rotatably moveable relative to the second member.

12. The seal assembly as recited in claim 8, wherein the first member is axially moveable relative to the second member.

13. The seal assembly as recited in claim 8, wherein the diameter of the inner edge of the first backing ring and the diameter of the inner edge of the second backing ring are from about 0.002-inch to about 0.010-inch greater than the outside diameter of the second member.

14. The seal assembly as recited in claim 8, wherein the diameter of the inner edge of the seal member is approximately from 0.001-inch to 0.005-inch less than the outside diameter of the second member prior to installation of the second member through the seal member.

15. A hydraulic actuator, comprising:

a hollow cylinder having a longitudinal axis, an inner surface, and two ends;

a piston movably disposed in the cylinder, the piston having a longitudinal axis, two ends, an outer surface, and an annular peripheral groove approximately at the midpoint along the axis, the groove being axially defined by a first shoulder and a second shoulder at each edge of the groove, and the piston is tapered inwardly towards each end from each respective shoulder, such that the diameter of the piston at each shoulder is greater than the diameter at each respective end of the piston;

a seal assembly disposed in the annular groove of the piston for placing the piston in tight sealing contact with the inner surface of the cylinder, the seal assembly comprising:

an annular seal member comprising PTFE resin and having an inner edge and an outer edge, the seal member adapted to be disposed in the groove in the piston so that the inner edge surface of the seal member contacts the piston, and the outer edge surface contacts the inner surface of the cylinder, placing the piston and cylinder in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder; and a piston rod assembly having a first end and a second end, the first end of the piston rod assembly connected to the piston and the second end of the piston rod assembly extending outwardly of an end of the cylinders, wherein the piston's axial alignment can differ over a range of angles from that of the cylinder while allowing movement of the piston and maintaining the tight sealing contact between the piston and the cylinder inner surface, and wherein the spring exerts force axially between the shoulders to compress the seal member, impelling the seal member to increase in dimension radially and maintain the tight sealing contact between the respective inner and outer surfaces of the piston and cylinder.

16. The hydraulic actuator as recited in claim 15, wherein the first backing ring is bonded to the seal member.

17. The hydraulic actuator as recited in claim 15, wherein the second backing ring is bonded to the seal member.

18. The hydraulic actuator as recited in claim 15, wherein the diameter of the outer edge of the first backing ring and the diameter of the outer edge of the second backing ring are from about 0.002-inch to about 0.010-inch less than the inside diameter of the cylinder.

19. The hydraulic actuator as recited in claim 15, wherein the diameter of the outer edge of the seal member is approximately from 0.001-inch to 0.005-inch greater than the inside diameter of the cylinder prior to installation of the seal member in the cylinder.

20. A hydraulic actuator, comprising:

a hollow casing having a longitudinal axis, an inner surface having a circular shape where the inner surface intersects any plane perpendicular to the axis, two ends, and an annular groove in the inner surface approximately at the midpoint along the cylinder's axis and axially defined by a first shoulder and a second shoulder at each edge of the groove, and the casing is tapered inwardly towards each shoulder from each respective end, such that the diameter of the casing at each shoulder is less than the diameter at each respective end of the casing;

a cylindrical piston movably disposed in the casing and having a longitudinal axis;

a seal assembly disposed in the annular groove of the casing for placing the inner surface of the casing in tight sealing contact with the piston, the seal assembly comprising:

an annular seal member comprising PTFE resin and having an inner edge and an outer edge, the outer edge adapted to be disposed in the groove in the casing so that the outer edge surface of the seal member contacts the casing, and the inner edge surface contacts the piston outer surface, placing the piston and casing in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder; and a piston rod assembly having a first end and a second end, the first end of the piston rod assembly connected to the piston and the second end of the piston rod assembly extending outwardly of an end of the casing, wherein the piston's axial alignment can differ over a range of angles from that of the casing while allowing movement of the piston and maintaining the tight sealing contact between the piston and the casing; and wherein the spring exerts force axially between the shoulders to compress the seal member, impelling the seal member to increase in dimension radially and maintain the tight sealing contact between the respective inner and outer surfaces of the piston and casing.

21. The hydraulic actuator as recited in claim 20, wherein the first backing ring is bonded to the seal member.

22. The hydraulic actuator as recited in claim 20, wherein the second backing ring is bonded to the seal member.

23. The hydraulic actuator as recited in claim 20, wherein the diameter of the inner edge of the first backing ring and the diameter of the inner edge of the second backing ring are from about 0.020-inch to about 0.010-inch more than the outside diameter of the piston.

24. The hydraulic actuator as recited in claim 20, wherein the diameter of inner edge of the seal member is approximately from 0.001-inch to 0.005-inch less than the outside diameter of the piston prior to installation of the piston through the seal member.

25. An active mount for mounting a vibrating component to a support structure for use in a system for reducing vibration transmission from the vibrating component to the support structure, the active mount comprising:

a housing adapted to be attached to one of the vibrating component or the support structure; and a hydraulic actuator disposed in the housing, the actuator comprising:

a hollow cylinder having an inner surface;

a piston movably disposed at least in part within the cylinder, the piston having an outer surface and an annular peripheral groove axially defined by a first shoulder and a second shoulder;

a piston rod assembly having a first end and a second end, the first end of the piston rod assembly connected to the piston, and the second end of the piston rod assembly extending outwardly of an end of the cylinder and adapted to be attached to the other one of the vibrating component or the support structure;

an annular seal member comprising PTFE resin and having an inner edge and an outer edge, the seal member adapted to be disposed in the groove in the piston so that the inner edge surface of the seal member contacts the piston, and the outer edge surface contacts the inner surface of the cylinder, placing the piston and cylinder in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder, wherein the spring exerts force axially between the shoulders to compress the seal member, impelling the seal member to increase in dimension radially and maintain the tight sealing contact between the respective inner and outer surfaces of the piston and cylinder.

26. An active mount as recited in claim 25, wherein the first backing ring is bonded to the seal member.

27. An active mount as recited in claim 25, wherein the second backing ring is bonded to the seal member.

28. An active mount as recited in claim 25, wherein the piston has a longitudinal axis and is tapered inwardly towards each end from each respective shoulder, such that the diameter of the piston at each shoulder is greater than the diameter at each respective end of the piston and the piston's axial alignment can differ from that of the cylinder while allowing movement of the piston and maintaining the tight sealing contact between the piston and the cylinder.

29. An active mount as recited in claim 25, wherein the piston rod assembly further comprises an elastomeric bearing with two faces, a mounting plate at the piston rod assembly first end interposed between and mounted to one face of the bearing and to the piston, and a mounting member at the piston rod assembly second end mounted to the other face of the bearing.

30. An active mount for mounting a vibrating component to a support structure for use in a system for reducing vibration transmission from the vibrating component to the support structure, the active mount comprising:

a housing adapted to be attached to one of the vibrating component or the support structure; and a hydraulic actuator disposed in the housing, the actuator comprising:

a hollow casing having a longitudinal axis, an inner surface having a circular shape where the inner surface intersects any plane perpendicular to the axis, two ends, and an annular groove in the inner surface approximately at the midpoint along the cylinder's axis and axially defined by a first shoulder and a second shoulder at each edge of the groove;

a cylindrical piston movably disposed in the casing and having a longitudinal axis;

a piston rod assembly having a first end and a second end, the first end of the piston rod assembly connected to the piston and the second end of the piston rod assembly extending outwardly of an end of the casing, an annular seal member comprising PTFE resin and having an inner edge and an outer edge, the outer edge adapted to be disposed in the groove in the casing so that the outer edge surface of the seal member contacts the casing, and the inner edge surface contacts the piston outer surface, placing the piston and casing in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder, wherein the spring exerts force axially between the shoulders to compress the, seal member, impelling the seal member to increase in dimension radially and maintain the tight sealing contact between the respective inner and outer surfaces of the piston and casing.

31. An active mount as recited in claim 30, wherein the first backing ring is bonded to the seal member.

32. An active mount as recited in claim 30, wherein the second backing ring is bonded to the seal member.

33. An active mount as recited in claim 30, wherein the casing is tapered inwardly towards each shoulder from each respective end, such that the diameter of the casing at each shoulder is less than the diameter at each respective end of the casing.

34. An active mount as recited in claim 30, wherein the piston rod assembly further comprises an elastomeric bearing with two faces, a mounting plate at the piston rod assembly first end interposed between and mounted to one face of the bearing and to the piston, and a mounting member at the piston rod assembly second end mounted to the other face of the bearing.

35. An active mount for mounting a vibrating component to a support structure for use in a system for reducing vibration transmission from the vibrating component to the support structure, the active mount comprising:

a housing adapted to be attached to one of the vibrating component or the support structure; and a hydraulic actuator disposed in the housing, the actuator comprising:

a hollow cylinder having a longitudinal axis, an inner surface, and two ends;

a piston movably disposed in the cylinder, the piston having a longitudinal axis, two ends, an outer surface, and an annular peripheral groove approximately at the midpoint along the axis, the groove being axially defined by a first shoulder and a second shoulder at each edge of the groove, and the piston is tapered inwardly towards each end from each respective shoulder, such that the diameter of the piston at each shoulder is greater than the diameter at each respective end of the piston;

a seal assembly disposed in the annular groove of the piston for placing the piston in tight sealing contact with the inner surface of the cylinder, the seal assembly comprising:

an annular seal member comprising PTFE resin and having an inner edge and an outer edge, the seal member adapted to be disposed in the groove in the piston so that the inner edge surface of the seal member contacts the piston, and the outer edge surface contacts the inner surface of the cylinder, placing the piston and cylinder in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder, and a piston rod assembly having a first end and a second end, the first end of the piston rod assembly connected to the piston and the second end of the piston rod assembly extending outwardly of an end of the cylinder, wherein the piston's axial alignment can differ over a range of angles from that of the cylinder while allowing movement of the piston and maintaining the tight sealing contact between the piston and the cylinder inner surface, and wherein the spring exerts force axially between the shoulders to compress the seal member, impelling the seal member to increase in dimension radially and maintain the tight sealing contact between the respective inner and outer surfaces of the piston and cylinder.

36. An active mount as recited in claim 35, wherein the first backing ring is bonded to the seal member.

37. An active mount as recited in claim 35, wherein the second backing ring is bonded to the seal member.

38. An active mount as recited in claim 35, wherein the piston rod assembly further comprises an elastomeric bearing with two faces, a mounting plate at the piston rod assembly first end interposed between and mounted to one face of the bearing and to the piston, and a mounting member at the piston rod assembly second end mounted to the other face of the bearing.

39. An active mount for mounting a vibrating component to a support structure for use in a system for reducing vibration transmission from the vibrating component to the support structure, the active mount comprising:

a housing adapted to be attached to one of the vibrating component or the support structure; and a hydraulic actuator disposed in the housing, the actuator comprising:

a hollow casing having a longitudinal axis, an inner surface having a circular shape where the inner surface intersects any plane perpendicular to the axis, two ends, and an annular groove in the inner surface approximately at the midpoint along the cylinder's axis and axially defined by a first shoulder and a second shoulder at each edge of the groove, and the casing is tapered inwardly towards each shoulder from each respective end, such that the diameter of the casing at each shoulder is less than the diameter at each respective end of the casing;

a cylindrical piston movably disposed in the casing and having a longitudinal axis;

a seal assembly disposed in the annular groove of the casing for placing the inner surface of the casing in tight sealing contact with the piston, the seal assembly comprising:

an annular seal member comprising PTFE resin and having an inner edge and an outer edge, the outer edge adapted to be disposed in the groove in the casing so that the outer edge surface of the seal member contacts the casing, and the inner edge surface contacts the piston outer surface, placing the piston and casing in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder; and a piston rod assembly having a first end and a second end, the first end of the piston rod assembly connected to the piston and the second end of the piston rod assembly extending outwardly of an end of the casing, wherein the piston's axial alignment can differ over a range of angles from that of the casing while allowing movement of the piston and maintaining the tight sealing contact between the piston and the casing, and wherein the spring exerts force axially between the shoulders to compress the seal member, impelling the seal member to increase in dimension radially and maintain the tight sealing contact between the respective inner and outer surfaces of the piston and casing.

40. An active mount as recited in claim 39, wherein the first backing ring is bonded to the seal member.

41. An active mount as recited in claim 39, wherein the second backing ring is bonded to the seal member.

42. An active mount for mounting a transmission gearbox to an airframe of a rotary wing aircraft, the active mount comprising:

a housing adapted to be attached to one of the gearbox or the airframe; and a hydraulic actuator disposed in the housing, the actuator comprising, a hollow cylinder having an inner surface;

a piston movably disposed at least in part within the cylinder, the piston having an outer surface and an annular peripheral groove axially defined by a first shoulder and a second shoulder;

a piston rod assembly having a first end and a second end, the first end of the piston rod assembly connected to the piston, and the second end of the piston rod assembly extending outwardly of an end of the cylinder and adapted to be attached to the other one of the vibrating component or the support structure;

an annular seal member comprising PTFE resin and having an inner edge and an outer edge, the seal member adapted to be disposed in the groove in the piston so that the, inner edge surface of the seal member contacts the piston, and the outer edge surface contacts the inner surface of the cylinder, placing the piston and cylinder in tight sealing contact;

an annular first backing ring adapted to be disposed substantially in the groove and between the seal member and the first shoulder;

an annular second backing ring adapted to be disposed substantially in the groove and between the seal member and the second shoulder; and an annular compression spring adapted to be disposed substantially in the groove and between the first backing ring and the first shoulder, wherein the spring exerts force axially between the shoulders to compress the seal member, impelling the seal member to increase in dimension radially and maintain the tight sealing contact between the respective inner and outer surfaces of the piston and cylinder.

43. An active mount as recited in claim 42, wherein the piston has a longitudinal axis and is tapered inwardly towards each end from each respective shoulder, such that the diameter of the piston at each shoulder is greater than the diameter at each respective end of the piston and the piston's axial alignment can differ over a range of angles from that of the casing while allowing movement of the piston and maintaining the tight sealing contact between the piston and the casing.

44. An active mount as recited in claim 42, wherein the piston rod assembly further comprises an elastomeric bearing with two faces, a mounting plate at the piston rod assembly first end interposed between and mounted to one face of the bearing and to the piston, and a mounting member at the piston rod assembly second end mounted to the other face of the bearing.

45. An active mount as recited in claim 42, wherein the first backing ring is bonded to the seal member.

46. An active mount as recited in claim 42, wherein the second backing ring is bonded to the seal member.

* * * * *